United States Patent
Zhao

(10) Patent No.: US 10,225,850 B2
(45) Date of Patent: Mar. 5, 2019

(54) VEHICULAR NETWORK COMMUNICATION METHOD, AND APPARATUSES

(71) Applicant: Huawei Technologies Co., Ltd., Shenzhen, Guangdong (CN)

(72) Inventor: Zhenshan Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/639,882

(22) Filed: Jun. 30, 2017

(65) Prior Publication Data

US 2017/0303293 A1    Oct. 19, 2017

Related U.S. Application Data

(63) Continuation of application No. PCT/CN2014/095806, filed on Dec. 31, 2014.

(51) Int. Cl.
 *H04W 72/12* (2009.01)
 *H04L 29/08* (2006.01)
 *H04W 72/04* (2009.01)

(52) U.S. Cl.
 CPC ....... *H04W 72/12* (2013.01); *H04W 72/1284* (2013.01); *H04L 67/12* (2013.01); *H04W 72/042* (2013.01); *H04W 72/048* (2013.01)

(58) Field of Classification Search
 CPC .............. H04W 72/12; H04W 72/042; H04W 72/0413; H04W 72/14; H04W 72/0446; H04W 28/0278
 See application file for complete search history.

(56) References Cited

U.S. PATENT DOCUMENTS

| | | |
|---|---|---|
| 2005/0171682 A1 | 8/2005 | Adachi |
| 2012/0099452 A1 | 4/2012 | Dai et al. |
| 2014/0269352 A1 | 9/2014 | Sun et al. |
| 2015/0208384 A1* | 7/2015 | Baghel ............. H04W 72/04 455/450 |
| 2016/0007229 A1 | 1/2016 | Gao et al. |

FOREIGN PATENT DOCUMENTS

| | | |
|---|---|---|
| CN | 1584944 A | 2/2005 |
| CN | 101873704 A | 10/2010 |
| CN | 104247541 B | 12/2014 |
| EP | 2515597 A1 | 10/2012 |
| EP | 2958387 A1 | 12/2015 |
| JP | 2004021517 A | 1/2004 |
| JP | 2011035721 A | 2/2011 |
| JP | 2012528495 A | 11/2012 |
| WO | 2014139083 A1 | 9/2014 |
| WO | 2014183664 A1 | 11/2014 |

* cited by examiner

*Primary Examiner* — Jamal Javaid

(57) ABSTRACT

An Internet-of-Vehicles communication method and apparatuses are disclosed. The Internet-of-Vehicles communication method may include: sending, by UE, a scheduling request to a base station; receiving, by the UE, notification information sent by the base station for allocating a buffer status report BSR transmission resource; transmitting, by the UE, a BSR on the BSR transmission resource allocated by the base station, where the BSR carries driving status information of the UE, and the driving status information is used by the base station to allocate a radio resource applicable to a current driving status to the UE according to the driving status information; and transmitting, by the UE, data by using the radio resource allocated by the base station.

18 Claims, 8 Drawing Sheets

| Buffer size #0 | | Buffer size #1 | Oct 1 |
| Buffer size #1 | | Buffer size #2 | Oct 2 |
| Buffer size #2 | Buffer size #3 | | Oct 3 |
| Status information byte #0 | | | Oct 4 |
| ⋮ | | | |
| Status information byte #N-1 | | | Oct N+3 |

VEHICULAR NETWORK COMMUNICATION METHOD, AND APPARATUSES

CROSS REFERENCE TO RELATED APPLICATIONS

This application is continuation of International Application No. PCT/CN2014/095806, filed on Dec. 31, 2014, the disclosure of which is hereby incorporated by reference in its entirety.

TECHNICAL FIELD

The present disclosure relates to the field of network communications technologies, and in particular, to an Internet-of-Vehicles communication method, and apparatuses.

BACKGROUND

In recent years, people pay more attention to vehicle networks. Road traffic security and reliability can be improved by means of inter-vehicle communication or vehicle-RSU (roadside unit) communication, thereby improving traffic efficiency.

Currently, the IEEE (Institute of Electrical and Electronics Engineers) standard extensible communication protocol is applied to in-vehicle electronic wireless communication and conforms to an application related to ITS (intelligent transportation systems). At an application layer, data exchange between high-speed vehicles and between a vehicle and ITS roadside infrastructure are included.

In the prior art, researches on inter-vehicle communication are conducted mainly with assistance of cellular networks.

Cellular communication uses technologies such as 2G, 3G and 4G. An LTE (Long Term Evolution) technology used in a 4G system has advantages such as high-speed, low-latency, wide-coverage, and high speed mobile terminal-supporting. When vehicles communicate with each other on a cellular network, dynamic scheduling of transmission resources may be performed by fully utilizing a central scheduler (for example, an eNB (evolved NodeB)).

In an LTE system, when UE (user equipment) needs to transmit new data, an eNB needs to schedule a resource for the UE, and then the UE transmits a BSR (buffer status report) on the scheduled resource. If the UE needs to upload other information to the eNB, for example, if the UE needs to upload current driving status information of a vehicle, the UE needs to further upload information about the UE through a PUSCH (physical uplink shared channel) after uploading the BSR. However, such a technological implementation manner has an apparent disadvantage: An additional transmission delay is caused if other information is uploaded after a BSR is uploaded. Because a requirement for a delay is high when a vehicle transmits a security message, a relatively great delay may be caused by uploading current driving status information, and performance of transmitting a security message may be degraded.

SUMMARY

Embodiments of the present disclosure provide an Internet-of-Vehicles communication method, and apparatuses, so as to reduce a delay of uploading information by UE.

To resolve the foregoing technical problem, the embodiments of the present disclosure disclose the following technical solutions.

According to a first aspect, an Internet-of-Vehicles communication method is provided, including:
sending, by user equipment UE, a scheduling request to a base station;
receiving, by the UE, notification information sent by the base station for allocating a buffer status report BSR transmission resource;
transmitting, by the UE, a BSR on the BSR transmission resource allocated by the base station, where the BSR carries driving status information of the UE, and the driving status information is used by the base station to allocate a radio resource applicable to a current driving status to the UE according to the driving status information; and
transmitting, by the UE, data by using the radio resource allocated by the base station.

With reference to the first aspect, in a first possible implementation manner, that the BSR carries driving status information of the UE includes:
obtaining, by the UE, an index relationship indicating a driving status of the UE;
determining, by the UE according to the index relationship, an index value that corresponds to the current driving status; and
loading, by the UE, the index value in the BSR.

With reference to the first aspect, in a second possible implementation manner, that the BSR carries driving status information of the UE includes:
loading, by the UE, the driving status information of the UE on multiple bytes in a driving status information indicator field in the BSR.

With reference to any one of the first aspect, and the first or the second possible implementation manner, in a third possible implementation manner, the driving status information of the UE includes:
at least one of location information, moving speed information, or moving direction information of the UE.

According to a second aspect, an Internet-of-Vehicles communication method is provided, including:
receiving, by a base station, a scheduling request sent by UE;
after receiving the scheduling request, allocating, by the base station, a BSR transmission resource to the UE, and sending, to the UE, notification information for allocating the BSR transmission resource;
receiving, by the base station, a BSR transmitted by the UE on the BSR transmission resource, where the BSR carries driving status information of the UE; and
allocating, by the base station, a radio resource applicable to a current driving status to the UE according to the driving status information.

With reference to the second aspect, in a first possible implementation manner, that the BSR carries driving status information of the UE includes:
the BSR carries an index value that corresponds to the current driving status of the UE, and the index value is determined by the UE according to an obtained index relationship indicating a driving status of the UE.

With reference to the second aspect, in a second possible implementation manner, that the BSR carries driving status information of the UE includes:
loading the driving status information of the UE on multiple bytes in a driving status information indicator field in the BSR.

With reference to any one of the second aspect, and the first or the second possible implementation manner, in a third possible implementation manner, the driving status information of the UE includes:

at least one of location information, moving speed information, or moving direction information of the UE.

According to a third aspect, an Internet-of-Vehicles communications apparatus is provided, including:

a scheduling request sending module, configured to send a scheduling request to a base station;

a notification information receiving module, configured to: after the scheduling request sending module sends the scheduling request to the base station, receive notification information sent by the base station for allocating a buffer status report BSR transmission resource;

a BSR uploading module, configured to: after the notification information receiving module receives the notification information sent by the base station for allocating the buffer status report BSR transmission resource, transmit a BSR on the BSR transmission resource allocated by the base station, where the BSR carries driving status information of the UE, and the driving status information is used by the base station to allocate a radio resource applicable to a current driving status to the UE according to the driving status information; and a transmission module, configured to transmit data by using the radio resource allocated by the base station.

With reference to the third aspect, in a first possible implementation manner, the BSR uploading module includes:

an index relationship obtaining unit, configured to obtain an index relationship indicating a driving status of the UE;

an index value determining unit, configured to determine, according to the index relationship, an index value that corresponds to the current driving status; and an index value loading unit, configured to load the index value in the BSR.

With reference to the third aspect, in a second possible implementation manner, the BSR uploading module specifically loads the driving status information of the UE on multiple bytes in a driving status information indicator field in the BSR.

With reference to any one of the third aspect, and the first or the second possible implementation manner, in a third possible implementation manner, the driving status information of the UE includes:

at least one of location information, moving speed information, or moving direction information of the UE.

According to a fourth aspect, a resource allocation apparatus is provided, including:

a scheduling request receiving module, configured to receive a scheduling request sent by UE;

a BSR transmission resource scheduling module, configured to: after the scheduling request receiving module receives the scheduling request, allocate a BSR transmission resource to the UE, and send, to the UE, notification information for allocating the BSR transmission resource;

a BSR receiving module, configured to receive a BSR transmitted by the UE on the BSR transmission resource, where the BSR carries driving status information of the UE; and a radio resource allocation module, configured to: after the BSR receiving module receives the BSR transmitted by the UE on the BSR transmission resource, allocate a radio resource applicable to a current driving status to the UE according to the driving status information.

With reference to the fourth aspect, in a first possible implementation manner, the BSR carries an index value that corresponds to the current driving status of the UE, and the index value is determined by the UE according to an obtained index relationship indicating a driving status of the UE.

With reference to the fourth aspect, in a second possible implementation manner, the driving status information of the UE is loaded on multiple bytes in a driving status information indicator field in the BSR.

With reference to any one of the fourth aspect, and the first or the second possible implementation manner, in a third possible implementation manner, the driving status information of the UE includes:

at least one of location information, moving speed information, or moving direction information of the UE.

In the embodiments of the present disclosure, when transmitting a BSR on a transmission resource allocated by a base station, UE uses the BSR to carry current driving status information of the UE. In this way, the base station can know, according to the BSR uploaded by the UE, not only buffer size information of a service packet that is transmitted by the UE, but also the current driving status information of a UE, so that the UE does not need to use other additional signaling scheduling resources to transmit driving status information to the base station. Therefore, a time for uploading the driving status information by the UE can be shortened, and a delay of uploading the status information by the UE can be reduced, thereby improving efficiency of uploading the driving status information by the UE.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make a person skilled in the art understand the technical solutions in the embodiments of the present disclosure better, and make the objectives, features, and advantages of the embodiments of the present disclosure clearer, the following further describes the technical solutions in the embodiments of the present disclosure in detail with reference to the accompanying drawings.

Figure 1:
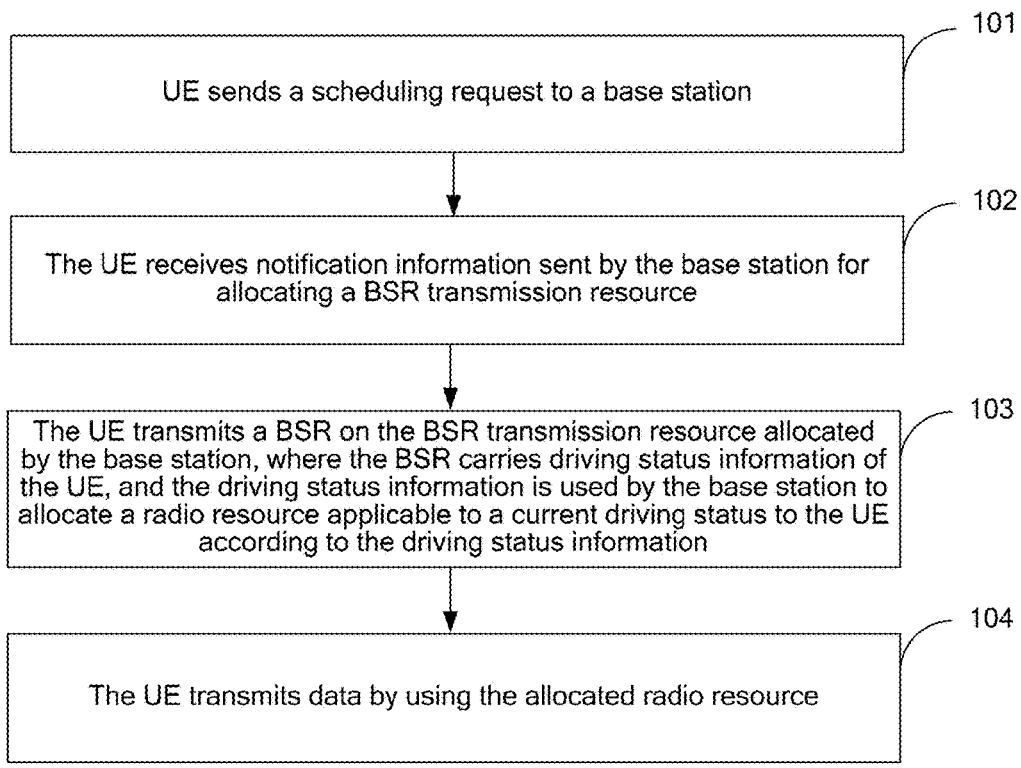
FIG. 1 is a schematic flowchart of an embodiment of an Internet-of-Vehicles communication method according to the present disclosure.

As shown in FIG. 1, FIG. 1 is an embodiment of an Internet-of-Vehicles communication method according to the present disclosure. The method may include the following execution steps.

Step 101: UE sends a scheduling request to a base station.

This embodiment of the present disclosure shows an Internet-of-Vehicles communication process in an LTE system.

In the LTE system, when the UE needs to transmit data information to the base station, the UE needs to first send an SR (scheduling request) to the base station. The base station receives the SR uploaded by the UE and knows that there is data to be transmitted by the UE currently.

Step 102: The UE receives notification information sent by the base station for allocating a BSR transmission resource.

In this step, after receiving the SR uploaded by the UE, the base station schedules a transmission resource for a BSR to be subsequently uploaded by the UE, and sends, to the UE, the notification information for allocating the BSR transmission resource. In this way, the UE may upload the BSR by using the transmission resource scheduled by the base station.

Step 103: The UE transmits a BSR on the BSR transmission resource allocated by the base station, where the BSR carries driving status information of the UE, and the driving status information is used by the base station to allocate a radio resource applicable to a current driving status to the UE according to the driving status information.

In this embodiment of the present disclosure, different from the prior art, the BSR uploaded by the UE carries current driving status information of the UE. This is because the current driving status of the UE generally needs to be considered when the base station allocates the radio resource to the UE, so as to perform resource scheduling more effectively. For example, the base station may allocate same resources for UEs far away from each other spatially if knowing location information of the UEs, so as to reuse resources and improve resource utilization. Alternatively, the base station may schedule, to a contention resource, UE moving at a high speed if knowing speed information of the UE, so as to avoid a problem of frequent handovers caused by the UE quickly moving out of a cell. Therefore, the base station needs to obtain the current driving status information of the UE. In this embodiment of the present disclosure, the radio resource is used for communication between the UE and another UE, RSU or another terminal.

Specifically, the driving status information may include but is not limited to: at least one of current location information, moving speed information, or moving direction information of the UE. In this embodiment of the present disclosure, the current driving status information of the UE is directly carried in the BSR that is uploaded by the UE, so that the UE does not need to use other additional signaling resources to transmit the driving status information to the base station.

After obtaining the current driving status information of the UE, the base station allocates the radio resource applicable to the current driving status to the UE according to the current driving status of the UE and a status of a buffer.

Step 104: The UE transmits data by using the allocated radio resource.

In this step, after the base station allocates the radio resource applicable to the current driving status to the UE, the UE may transmit data by using the allocated radio resource.

In this embodiment of the present disclosure, when transmitting a BSR on a transmission resource allocated by a base station, UE uses the BSR to carry current driving status information of the UE. In this way, the base station can know, according to the BSR uploaded by the UE, not only buffer size information of a service packet that is transmitted by the UE, but also the current driving status information of a UE, so that the UE does not need to use other additional signaling scheduling resources to transmit driving status information to the base station. Therefore, a time for uploading the driving status information by the UE can be shortened, and a delay of uploading the status information by the UE can be reduced, thereby improving efficiency of uploading the driving status information by the UE.

The following describes in detail, by using a specific embodiment, a specific implementation manner in which the BSR carries the driving status information of the UE.

In a specific implementation process, the driving status information of the UE may be explicitly transmitted in the BSR. That is, the driving status information of the UE is directly and explicitly loaded in the BSR.

Figure 2:
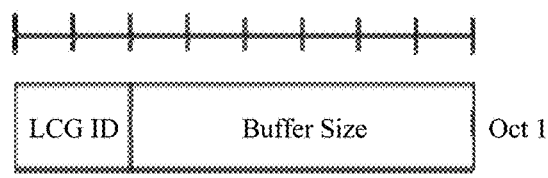
FIG. 2 is a schematic diagram of an existing short BSR format.
Figure 3:
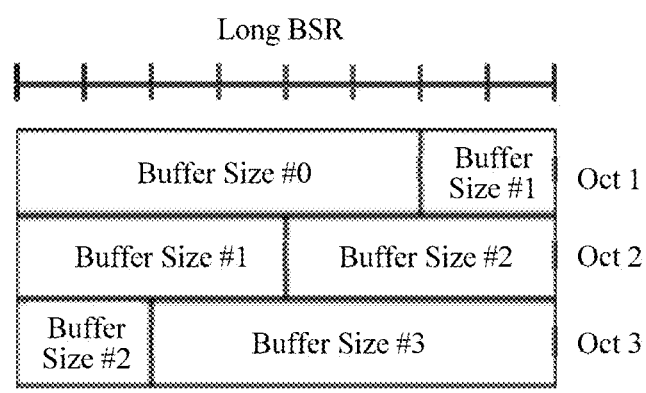
FIG. 3 is a schematic diagram of an existing long BSR format.

In an existing LTE system, BSRs generally have two formats: a short (short) BSR format and a long (long) BSR format, as shown in FIG. 2 and FIG. 3 respectively.

In the short BSR format shown in FIG. 2, a short BSR includes two information fields: an LCG ID (logical channel group identity), and a buffer size indicator field corresponding to the LCG ID.

In the long BSR format shown in FIG. 3, a long BSR includes four buffer size indicator fields, which correspond to LCG ID #0 to LCG ID #3 respectively. Oct in FIG. 3 represents octal (Octal). Oct 1 represents a first group of eight bits (bit), and Oct 1 to Oct 3 each represent eight bits, that is, every 24 bits is used to represents a long BSR.

In this embodiment of the present disclosure, the information fields indicating the driving status information of the UE, which are referred to as "driving status information indicator fields", are added respectively to BSRs in the existing short BSR format and in the existing long BSR format. In such an implementation manner, BSRs in a short BSR format and in a long BSR format are respectively shown in FIG. 4 and FIG. 5.

Figure 4:
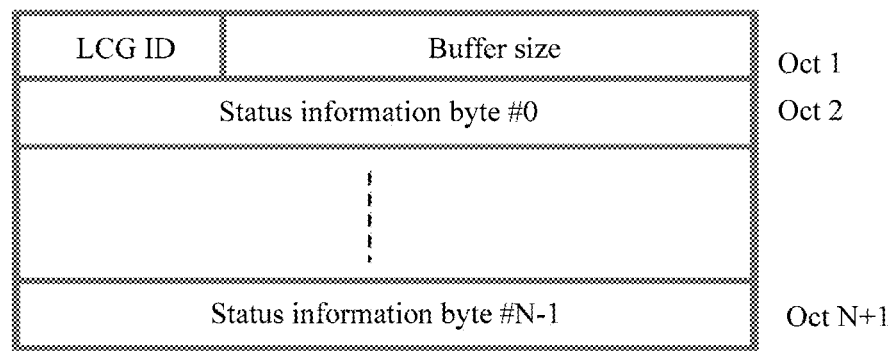
FIG. 4 is a schematic diagram of a short BSR format according to an embodiment of the present disclosure.

In the short BSR format shown in FIG. 4, the short BSR includes three information fields: an LCG ID, a buffer size indicator field corresponding to the LCG ID and a driving status information indicator field. The LCG ID and the buffer size form one byte (byte). The status information includes N bytes, and one or more types of status information may be loaded by using the N bytes in the information field.

Figures 5, 6:
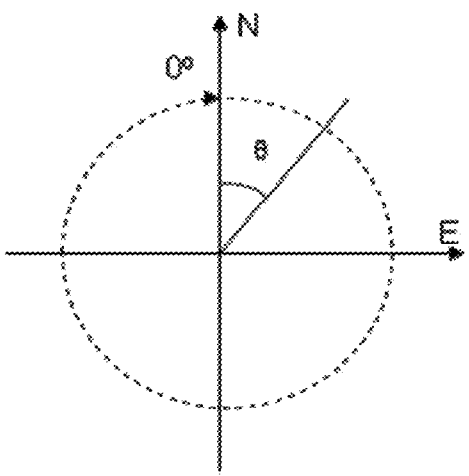
FIG. 5 is a schematic diagram of a long BSR format according to an embodiment of the present disclosure.
FIG. 6 is a schematic coordinate diagram of a moving direction according to an embodiment of the present disclosure.

In the long BSR format shown in FIG. 5, the long BSR includes two information fields: a buffer size indicator field and a driving status information indicator field. The buffer size field includes four information indicator fields, which respectively correspond to four logical channel groups, whose IDs are LCG ID #0 to LCG ID #3 respectively. The status information includes N bytes. Similarly, one or more types of status information may be loaded by using the N bytes in the information field.

Specifically, the driving status information of the UE may include: location information, moving speed (speed) information, or moving direction (direction) information of the UE. Therefore, in this embodiment of the present disclosure, any one or more types of status information among the location information, the moving speed information, or the moving direction information of the UE may be directly loaded by using the driving status information indicator fields (status information) added to the BSR.

It should be noted that in addition to explicitly loading the driving status information of the UE in the BSR, the driving status information of the UE may further be transmitted implicitly by using the BSR.

Figure 7:
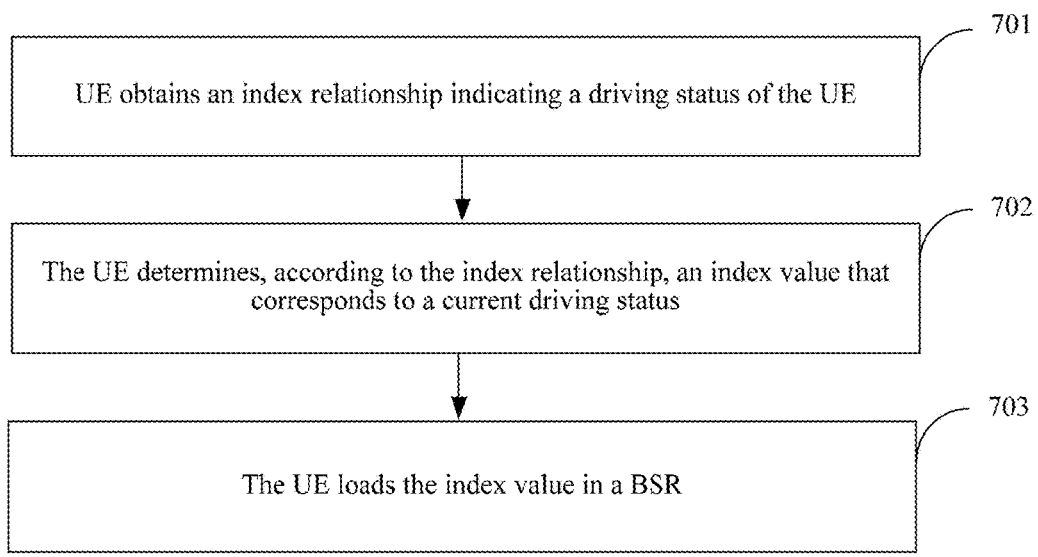
FIG. 7 is a schematic flowchart showing that UE transmits driving status information of the UE by using a BSR according to an embodiment of the present disclosure.

As shown in FIG. 7, FIG. 7 shows a process in which UE transmits driving status information of the UE by using a BSR. The process includes the following steps.

Step 701: The UE obtains an index relationship indicating a driving status of the UE.

Step 702: The UE determines, according to the index relationship, an index value that corresponds to a current driving status.

Step 703: The UE loads the index value in the BSR.

Specifically, a base station may broadcast, within an area of a cell, the index relationship indicating the driving status of the UE, or a terminal obtains, in a predefined manner, the index relationship indicating the driving status of the UE. That is, different index values correspond to different driving statuses of the UE. After obtaining the index relationship indicating the driving status of the UE, the UE determines, according to the index relationship, an index value that corresponds to the current driving status of the UE, further, loads the determined index value in the BSR, and uploads the BSR to the base station. In this way, the base station can finally determine current driving status information of the UE according to the received index value and by searching for the index relationship previously broadcast or the predefined index relationship.

The following describes in detail a manner in which the driving status information of the UE is transmitted implicitly in the BSR by using an example of an implementation manner in which the base station broadcasts the index relationship indicating the driving status of the UE.

In a specific application scenario, the base station may divide speeds or moving directions into multiple intervals, where different intervals correspond to different index relationships, and broadcast dividing standards and corresponding index numbers of speed intervals or moving direction intervals in the cell. The UE can determine a speed interval of the UE according to a current moving speed of the UE, or a moving direction interval of the UE according to a current moving direction of the UE, load a corresponding index number in the BSR, and upload the BSR to the base station.

For moving speeds of the UE, a numerical range is [0, X] km/h. The moving speeds may be indicated by using M bits in the BSR, where a greater M indicates more accurate speed information. The following shows two speed information indication methods.

In a first method, specific speed magnitudes are indicated by using M-bit information in the information field of status information in the BSR, and the speed magnitudes are accurate to 1 km/h. A specific embodiment is shown in the following Table 1, where X=600. The left side in Table 1 shows speed indication examples when M=8. In this case, if a terminal speed is greater than or equal to 254 km/h, the speed is represented by an index 254. The right side shows speed indication examples when M=9. In this case, if a terminal speed is greater than or equal to 510 km/h, the speed is represented by an index 510.

TABLE 1

| M = 8 | | M = 9 | |
| --- | --- | --- | --- |
| Index | Speed [km/h] | Index | Speed [km/h] |
| 0 | 0 | 0 | 0 |
| 1 | 1 | 1 | 1 |
| 2 | 2 | 2 | 2 |
| 3 | 3 | 3 | 3 |
| . | . | . | . |
| . | . | . | . |
| 253 | 253 | 253 | 253 |
| 254 | Speed >= 254 | 254 | 254 |
| 255 | Unavailable | 255 | 255 |
|  |  | 256 | 256 |
|  |  | . | . |
|  |  | . | . |
|  |  | 298 | 298 |
|  |  | 299 | 299 |
|  |  | 300 | 300 |
|  |  | 301 | 301 |
|  |  | . | . |
|  |  | . | . |
|  |  | 508 | 508 |
|  |  | 509 | 509 |
|  |  | 510 | Speed >= 510 |
|  |  | 511 | Unavailable |

In a second method, a speed range may be divided into multiple speed intervals, a difference between every two speed intervals is Y km/h, and different speed intervals are indicated by using the M-bit information in the information field of status information in the BSR. A specific embodiment is shown in the following Table. 2, where X=300, Y=5, and M=8. If a terminal speed is greater than 300 km/h, the speed is represented by an index 62.

TABLE 2

| Index | Speed [km/h] |
| --- | --- |
| 0 | Speed = 0 |
| 1 | 0 < Speed <= 5 |
| 2 | 5 < Speed <= 10 |
| 3 | 10 < Speed <= 5 |
| 4 | 15 < Speed <= 20 |
| 5 | 20 < Speed <= 25 |
| 6 | 25 < Speed <= 30 |
| 7 | 30 < Speed <= 35 |
| 8 | 35 < Speed <= 40 |
| 9 | 40 < Speed <= 45 |
| 10 | 45 < Speed <= 50 |
| 11 | 50 < Speed <= 55 |
| 12 | 55 < Speed <= 60 |
| 13 | 60 < Speed <= 65 |
| 14 | 65 < Speed <= 70 |
| 15 | 70 < Speed <= 75 |
| 16 | 75 < Speed <= 80 |
| 17 | 80 < Speed <= 85 |
| 18 | 85 < Speed <= 90 |
| 19 | 90 < Speed <= 95 |
| 20 | 95 < Speed <= 100 |

TABLE 2-continued

| Index | Speed [km/h] |
|---|---|
| 21 | 100 < Speed <= 105 |
| 22 | 105 < Speed <= 110 |
| 23 | 110 < Speed <= 115 |
| 24 | 115 < Speed <= 120 |
| 25 | 120 < Speed <= 125 |
| 26 | 125 < Speed <= 130 |
| 27 | 130 < Speed <= 135 |
| 28 | 135 < Speed <= 140 |
| 29 | 140 < Speed <= 145 |
| 30 | 145 < Speed <= 150 |
| 31 | 150 < Speed <= 155 |
| 32 | 155 < Speed <= 160 |
| 33 | 160 < Speed <= 165 |
| 34 | 165 < Speed <= 170 |
| 35 | 170 < Speed <= 175 |
| 36 | 175 < Speed <= 180 |
| 37 | 180 < Speed <= 185 |
| 38 | 185 < Speed <= 190 |
| 39 | 190 < Speed <= 195 |
| 40 | 195 < Speed <= 200 |
| 41 | 200 < Speed <= 205 |
| 42 | 205 < Speed <= 210 |
| 43 | 210 < Speed <= 215 |
| 44 | 215 < Speed <= 220 |
| 45 | 220 < Speed <= 225 |
| 46 | 225 < Speed <= 230 |
| 47 | 230 < Speed <= 235 |
| 48 | 235 < Speed <= 240 |
| 49 | 240 < Speed <= 245 |
| 50 | 245 < Speed <= 250 |
| 51 | 250 < Speed <= 255 |
| 52 | 255 < Speed <= 260 |
| 53 | 260 < Speed <= 265 |
| 54 | 265 < Speed <= 270 |
| 55 | 270 < Speed <= 275 |
| 56 | 275 < Speed <= 280 |
| 57 | 280 < Speed <= 285 |
| 58 | 285 < Speed <= 290 |
| 59 | 290 < Speed <= 295 |
| 60 | 295 < Speed <= 300 |
| 61 | Speed > 300 |
| 62 | Unavailable |
| 63-255 | Reserved |

In addition, for moving directions of the UE, a numerical range is [0, 360] degree. A due north direction corresponds to a 0-degree direction; a due east direction corresponds to a 90-degree direction; a due south direction corresponds to a 180-degree direction, and a due west direction corresponds to a 270-degree direction, as shown in FIG. 6. Different directions are indicated by using N-bit information in the information field of status information in the BSR, where a greater N indicates more accurate direction information.

In a first moving direction indication method, a specific direction is indicated by using the N-bit information in the information field of status information in the BSR, and the direction information is accurate to 1 degree. A specific embodiment is shown in the following Table 3, where N=9.

TABLE 3

| N = 9 | |
|---|---|
| Index | Direction [degree] |
| 0 | 0 |
| 1 | 1 |
| 2 | 2 |
| 3 | 3 |
| . | . |
| . | . |
| . | . |
| 358 | 358 |

TABLE 3-continued

| N = 9 | |
|---|---|
| Index | Direction [degree] |
| 359 | 359 |
| 360 | Unavailable |
| 361-511 | Reserved |

In another moving direction indication method, direction magnitudes are divided into multiple intervals, a difference between every two intervals is Y degree, and different direction intervals are indicated by using the N-bit information in the information field of status information in the BSR. A specific embodiment is shown in the following Table 4, where Y=2, and N=8.

TABLE 4

| N = 8 | |
|---|---|
| Index | Direction [degree] |
| 0 | 0 <= Direction <2 |
| 1 | 2 <= Direction <4 |
| 2 | 4 <= Direction <6 |
| 3 | 6 <= Direction <8 |
| . | . |
| . | . |
| . | . |
| 179 | 358 <= Direction <360 |
| 180 | Unavailable |
| 181-255 | Reserved |

In addition, the base station may further divide a coverage area of a current cell into multiple small areas according to geographical locations, where each area corresponds to a different index relationship, and broadcast, in the cell, area division standards and corresponding index numbers of different areas. Each UE in the cell can determine, according to information about a current location of the UE, an area in which the UE is located, load a corresponding area index number in the BSR, and upload the BSR to the base station.

For the location information of the UE, because the location information includes longitude information, latitude information, and height information, the three types of information may be separately indicated.

A longitude numerical range is (−180, 180) degrees. The longitude information may be indicated by using K1 bits in the BSR, where a greater K1 indicates more accurate longitude information. The longitude information may be divided into longitude ranges of a same size, with a longitude interval of Y1. A specific embodiment is as follows: If Y1=1 microdegree, a longitude range that needs to be indicated is (−180.000000, 180.000000) degrees, and the longitude information is unavailable, which is represented by 180.000001. In this case, K1=29. If Y1=1 millidegree, a longitude range that needs to be indicated is (−180.000, 180.000) degrees, and the longitude information is unavailable, which is represented by 180.001. In this case, K1=19.

A latitude numerical range is (−90, 90) degrees. The latitude information may be indicated by using K2 bits in the BSR, where a greater K2 indicates more accurate latitude information. The latitude information may be divided into latitude ranges of a same size, with a latitude interval of Y2. A specific embodiment is as follows: If Y2=1 microdegree, a latitude range that needs to be indicated is (−90.000000, 90.000000) degrees, and the latitude information is unavailable, which is represented by 90.000001. In this case, K2=28. If Y2=1 millidegree, a latitude range that needs to be indicated is (−90.000, 90.000) degrees, and the latitude information is unavailable, which is represented by 90.001. In this case, K2=18.

A height numerical range may be set according to an empirical value, for example, (−1000, 8000) meters. A sea level corresponds to 0 meters. If a height is 1000 meters below the sea level, the height is represented by −1000 meters. If a height is 8000 meters above the sea level, the height is represented by 8000 meters. The height information may be indicated by using K3 bits in the BSR, where a greater K3 indicates more accurate height information. Heights may be divided into height intervals of a same size, and a difference between every two height intervals is Y3 meters. A specific embodiment is as follows: If Y3=0.01, a height range that needs to be indicated is (−1000.00, 8000.00) meters, and the height information is unavailable, which is represented by 8000.01. In this case, K3=20.

In the foregoing Internet-of-Vehicles communication method embodiment, a procedure related to communication is described from aside of UE. The following further describes a related communication procedure from a side of a base station.

Figure 8:
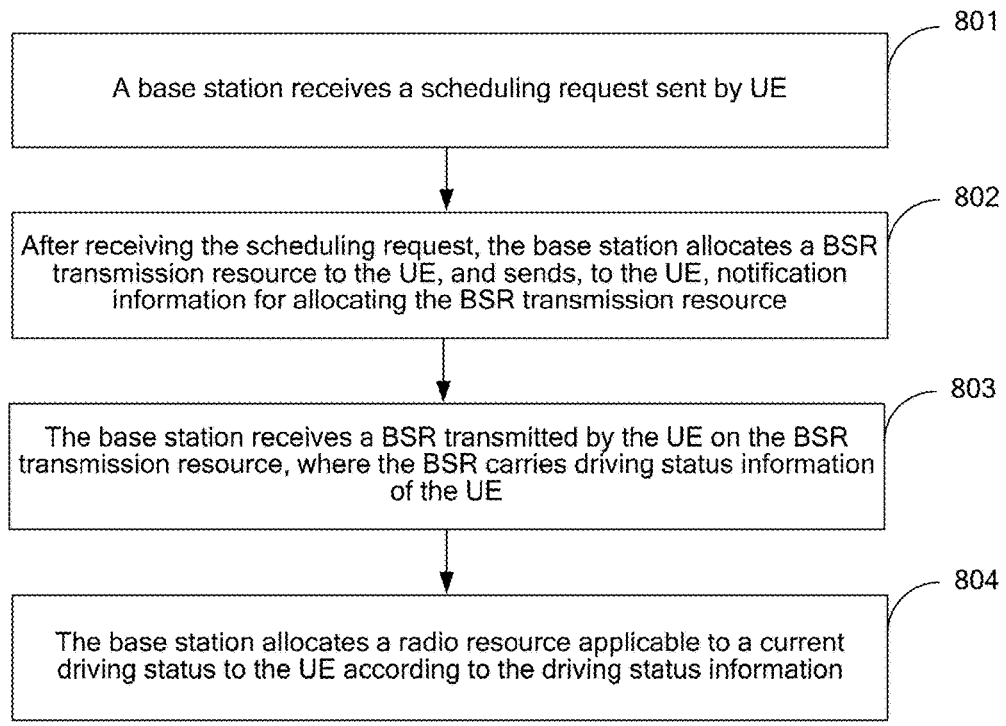
FIG. 8 is a schematic flowchart of an embodiment of another Internet-of-Vehicles communication method according to an embodiment of the present disclosure.

As shown in FIG. 8, FIG. 8 is an embodiment of an Internet-of-Vehicles communication method according to the present disclosure. The method may include the following execution steps.

Step 801: A base station receives a scheduling request sent by UE.

In an LTE system, when the UE needs to transmit data information to the base station, the UE needs to first send an SR to the base station. The base station receives the SR uploaded by the UE and knows that there is data to be transmitted by the UE currently.

Step 802: After receiving the scheduling request, the base station allocates a BSR transmission resource to the UE, and sends, to the UE, notification information for allocating the BSR transmission resource.

In this step, after receiving the SR uploaded by the UE, the base station schedules a transmission resource for a BSR to be subsequently uploaded by the UE, and sends, to the UE, the notification information for allocating the BSR transmission resource. In this way, the UE may upload the BSR by using the transmission resource scheduled by the base station.

Step 803: The base station receives a BSR transmitted by the UE on the BSR transmission resource, where the BSR carries driving status information of the UE.

In this step, different from the prior art, the BSR uploaded by the UE carries current driving status information of the UE. This is because a current driving status of the UE generally needs to be considered when the base station allocates a radio resource to the UE. For example, the base station may allocate same resources for UEs far away from each other spatially if knowing location information of the UEs, so as to reuse resources and improve resource utilization. Alternatively, the base station may schedule, to a contention resource, UE moving at a high speed if knowing speed information of the UE, so as to avoid a problem of frequent handovers caused by the UE quickly moving out of a cell. Therefore, the base station needs to obtain the current driving status information of the UE.

Specifically, the driving status information may include but is not limited to: at least one of current location information, moving speed information, or moving direction information of the UE. In this embodiment of the present disclosure, the current driving status information of the UE is directly loaded in the BSR that is uploaded by the UE, so that the UE does not need to use other additional signaling resources to transmit the driving status information to the base station.

Step 804: The base station allocates a radio resource applicable to a current driving status to the UE according to the driving status information.

In this step, after obtaining the current driving status information of the UE, the base station allocates the radio resource applicable to the current driving status to the UE according to the current driving status of the UE.

In this embodiment of the present disclosure, when transmitting a BSR on a transmission resource allocated by a base station, UE uses the BSR to carry current driving status information of the UE. In this way, the base station can know, according to the BSR uploaded by the UE, not only buffer size information of a service packet that is transmitted by the UE, but also the current driving status information of a UE, so that the UE does not need to use other additional signaling scheduling resources to transmit driving status information to the base station. Therefore, a time for uploading the driving status information by the UE can be shortened, and a delay of uploading the status information by the UE can be reduced, thereby improving efficiency of uploading the driving status information by the UE.

In a specific implementation process, the UE may explicitly transmit the driving status information of the UE in the BSR. That is, directly and explicitly load the driving status information of the UE in the BSR.

In this embodiment of the present disclosure, information fields indicating the driving status information of the UE, which are referred to as "driving status information indicator fields", are added respectively to BSRs in an existing short BSR format and in an existing long BSR format.

The short BSR includes three information fields: an LCG ID, a buffer size indicator field (buffer size) corresponding to the LCG ID and a driving status information indicator field (status information). The LCG ID and the buffer size form one byte (byte). The status information includes N bytes, and one or more types of status information may be loaded by using the N bytes in the information field.

The long BSR includes two information fields: a buffer size indicator field and a driving status information indicator field. The buffer size field includes four information indicator fields, which respectively correspond to four logical channel groups, whose IDs are LCG ID #0 to LCG ID #3 respectively. The status information includes N bytes. Similarly, one or more types of status information may be loaded by using the N bytes in the information field.

Specifically, the driving status information of the UE may include: location information, moving speed (speed) information, or moving direction (direction) information of the UE.

Moreover, in addition to explicitly loading the driving status information of UE in the BSR, the driving status information of the UE may further be transmitted implicitly by using the BSR.

Specifically, the base station may broadcast, within an area of a cell, an index relationship indicating a driving status of the UE, or a terminal obtains, in a predefined manner, the index relationship indicating the driving status of the UE. That is, different index values correspond to different driving statuses of the UE. After obtaining the index relationship indicating the driving status of the UE, the UE determines, according to the index relationship, an index value that corresponds to the current driving status of the UE, further, loads the determined index value in the BSR, and uploads the BSR to the base station. In this way, the base station can finally determine current driving status information of the UE according to the received index value and by searching for the index relationship previously broadcast or the predefined index relationship.

A detailed manner in which the driving status information of the UE is transmitted implicitly in a BSR is described in detail in the foregoing embodiments, and details are not described herein again.

Corresponding to the foregoing embodiment of the Internet-of-Vehicles communication method, the present disclosure provides an Internet-of-Vehicles communications apparatus.

Figure 9:
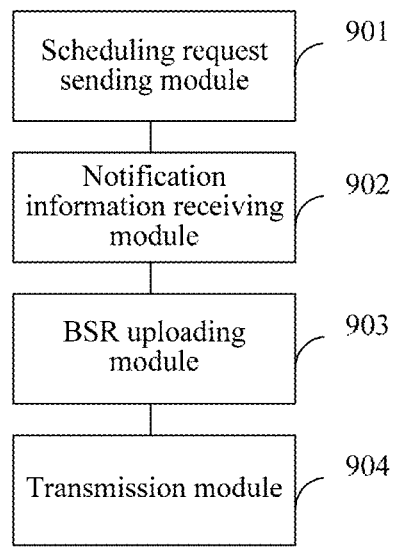
FIG. 9 is a schematic structural diagram of an Internet-of-Vehicles communications apparatus according to the present disclosure.

As shown in FIG. 9, FIG. 9 is an embodiment of an Internet-of-Vehicles communications apparatus according to the present disclosure. In a specific application scenario, the Internet-of-Vehicles communications apparatus is disposed on UE. The apparatus may specifically include:

a scheduling request sending module 901, configured to send a scheduling request to a base station;

a notification information receiving module 902, configured to: after the scheduling request sending module sends the scheduling request to the base station, receive notification information sent by the base station for allocating a buffer status report BSR transmission resource;

a BSR uploading module 903, configured to: after the notification information receiving module receives the notification information sent by the base station for allocating the buffer status report BSR transmission resource, transmit a BSR on the BSR transmission resource allocated by the base station, where the BSR carries driving status information of the UE, and the driving status information is used by the base station to allocate a radio resource applicable to a current driving status to the UE according to the driving status information; and a transmission module 904, configured to transmit data by using the radio resource allocated by the base station.

In this embodiment of the present disclosure, different from the prior art, the BSR uploaded by the UE by using the BSR uploading module carries current driving status information of the UE. This is because the current driving status of the UE generally needs to be considered when the base station allocates the radio resource to the UE. For example, the base station may allocate same resources for UEs far away from each other spatially if knowing location information of the UEs, so as to reuse resources and improve resource utilization. Alternatively, the base station may schedule, to a contention resource, UE moving at a high speed if knowing speed information of the UE, so as to avoid a problem of frequent handovers caused by the UE quickly moving out of a cell. Therefore, the base station needs to obtain the current driving status information of the UE.

In this embodiment of the present disclosure, when transmitting a BSR by using the foregoing Internet-of-Vehicles communications apparatus on a BSR transmission resource allocated by a base station, UE uses the BSR to carry current driving status information of the UE. In this way, the base station can know, according to the BSR uploaded by the UE, not only buffer size information of a service packet that is transmitted by the UE, but also the current driving status information of a vehicle, so that the UE does not need to use other additional signaling scheduling resources to transmit driving status information to the base station. Therefore, a time for uploading the driving status information by the UE can be shortened, and a delay of uploading the status information by the UE can be reduced, thereby improving efficiency of uploading the driving status information by the UE.

Specifically, the driving status information may include but is not limited to: at least one of current location information, moving speed information, or moving direction information of the UE. In this embodiment of the present disclosure, the current driving status information of the UE is directly carried in the BSR that is uploaded by the UE, so that the UE does not need to use other additional signaling resources to transmit the driving status information to the base station.

Figure 10:
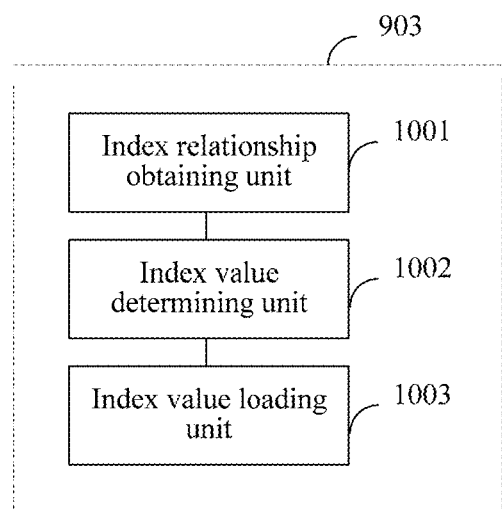
FIG. 10 is a schematic structural diagram of a BSR uploading module shown in FIG. 9.

In an embodiment shown in FIG. 10, the foregoing BSR uploading module 903 may specifically include:

an index relationship obtaining unit 1001, configured to obtain an index relationship indicating a driving status of the UE;

an index value determining unit 1002, configured to determine, according to the index relationship, an index value that corresponds to the current driving status; and an index value loading unit 1003, configured to load the index value in the BSR.

In this embodiment, the driving status information of the UE is transmitted implicitly by using the BSR. Specifically, a base station may broadcast, within an area of a cell, the index relationship indicating the driving status of the UE, or a terminal obtains, in a predefined manner, the index relationship indicating the driving status of the UE. That is, different index values correspond to different driving statuses of the UE.

After obtaining the index relationship indicating the driving status of the UE, the UE determines, according to the index relationship, an index value that corresponds to the current driving status of the UE, further, loads the determined index value in the BSR, and uploads the BSR to the base station. In this way, the base station can finally determine current driving status information of the UE according to the received index value and by searching for the index relationship previously broadcast or the predefined index relationship.

In addition, the driving status information of the UE may further be explicitly transmitted in the BSR. That is, the driving status information of the UE is directly and explicitly loaded in the BSR.

In a manner in which the driving status information of the UE is explicitly transmitted, the foregoing BSR uploading module specifically loads the driving status information of the UE on multiple bytes in a driving status information indicator field added to the BSR.

Corresponding to the foregoing embodiment of the Internet-of-Vehicles communication method, the present disclosure further provides a resource allocation apparatus.

Figure 11:
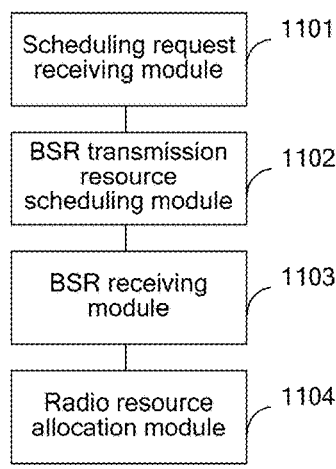
FIG. 11 is a schematic structural diagram of a resource allocation apparatus according to the present disclosure.

As shown in FIG. 11, FIG. 11 shows an embodiment of a resource allocation apparatus according to the present disclosure. In a specific application scenario, the resource allocation apparatus is disposed on a base station. The apparatus may specifically include:

a scheduling request receiving module 1101, configured to receive a scheduling request sent by UE;

a BSR transmission resource scheduling module 1102, configured to: after the scheduling request receiving module receives the scheduling request, allocate a BSR transmission resource to the UE, and send, to the UE, notification information for allocating the BSR transmission resource;

a BSR receiving module 1103, configured to receive a BSR transmitted by the UE on the BSR transmission resource, where the BSR carries driving status information of the UE; and a radio resource allocation module 1104, configured to: after the BSR receiving module receives the BSR transmitted by the UE on the BSR transmission resource, allocate a radio resource applicable to a current driving status to the UE according to the driving status information.

In this embodiment, the BSR uploaded by the UE carries current driving status information of the UE. This is because the current driving status of the UE generally needs to be considered when the base station allocates the radio resource to the UE. For example, the base station may allocate same resources for UEs far away from each other spatially if knowing location information of the UEs, so as to reuse resources and improve resource utilization. Alternatively, the base station may schedule, to a contention resource, UE moving at a highspeed if knowing speed information of the UE, so as to avoid a problem of frequent handovers caused by the UE quickly moving out of a cell. Therefore, the base station needs to obtain the current driving status information of the UE.

Specifically, the driving status information may include but is not limited to: at least one of current location information, moving speed information, or moving direction information of the UE. In this embodiment of the present disclosure, the current driving status information of the UE is directly loaded in the BSR that is uploaded by the UE, so that the UE does not need to use other additional signaling resources to transmit the driving status information to the base station.

In this embodiment of the present disclosure, when transmitting a BSR on a BSR transmission resource allocated by a base station, UE uses the BSR to carry current driving status information of the UE. In this way, the base station can know, according to the BSR uploaded by the UE, not only buffer size information of a service packet that is transmitted by the UE, but also the current driving status information of a UE, so that the UE does not need to use other additional signaling scheduling resources to transmit driving status information to the base station. Therefore, a time for uploading the driving status information by the UE can be shortened, and a delay of uploading the status information by the UE can be reduced, thereby improving efficiency of uploading the driving status information by the UE.

In a specific implementation process, the UE may explicitly transmit the driving status information of the UE in the BSR. That is, directly and explicitly load the driving status information of the UE in the BSR.

In this embodiment of the present disclosure, information fields indicating the driving status information of the UE, which are referred to as "driving status information indicator fields", are added respectively to BSRs in an existing short BSR format and in an existing long BSR format.

Moreover, in addition to explicitly loading the driving status information of UE in the BSR, the driving status information of the UE may further be transmitted implicitly by using the BSR.

Specifically, the base station may broadcast, within an area of a cell, an index relationship indicating a driving status of the UE, or a terminal obtains, in a predefined manner, the index relationship indicating the driving status of the UE. That is, different index values correspond to different driving statuses of the UE. After obtaining the index relationship indicating the driving status of the UE, the UE determines, according to the index relationship, an index value that corresponds to the current driving status of the UE, further, loads the determined index value in the BSR, and uploads the BSR to the base station. In this way, the base station can finally determine current driving status information of the UE according to the received index value and by searching for the index relationship previously broadcast or the predefined index relationship.

Figure 12:
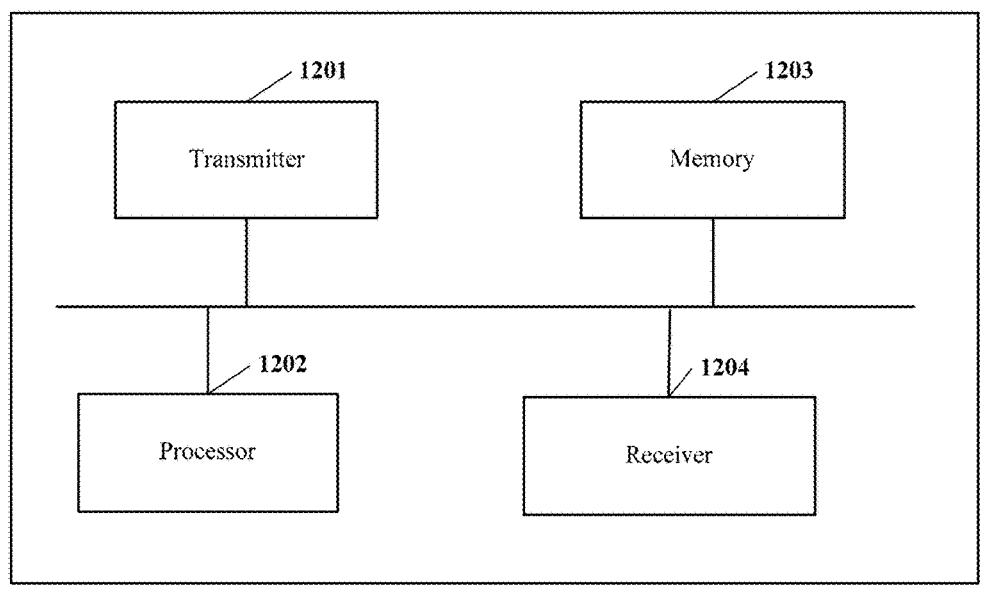
FIG. 12 is a schematic structural diagram of a computer system-based Internet-of-Vehicles communications apparatus according to the present disclosure.

As shown in FIG. 12, the present disclosure further provides a computer system-based Internet-of-Vehicles communications apparatus. In a specific implementation, the information notification apparatus may include: a transmitter 1201, a processor 1202, a memory 1203, and a receiver 1204. The memory 1203 is configured to store a computer executable instruction. The transmitter 1201 is configured to send a scheduling request to a base station. The receiver 1204 is configured to receive notification information sent by the base station for allocating a BSR transmission resource. The processor 1202 is configured to execute the computer executable instruction stored in the memory, that is: transmit a BSR on the BSR transmission resource allocated by the base station, where the BSR carries driving status information of UE, and the driving status information is used by the base station to allocate a radio resource applicable to a current driving status to the UE according to the driving status information; and transmit data by using the radio resource allocated by the base station.

In an embodiment, a manner in which the BSR carries the driving status information of the UE is as follows: The processor obtains an index relationship indicating a driving status of the UE, determines, according to the index relationship, an index value that corresponds to the current driving status, and loads the index value in the BSR.

In another embodiment, a manner in which the BSR carries the driving status information of the UE is as follows: The processor loads the driving status information of the UE on multiple bytes in a driving status information indicator field in the BSR.

Specifically, the driving status information may include but is not limited to: at least one of current location information, moving speed information, or moving direction information of the UE.

Figure 13:
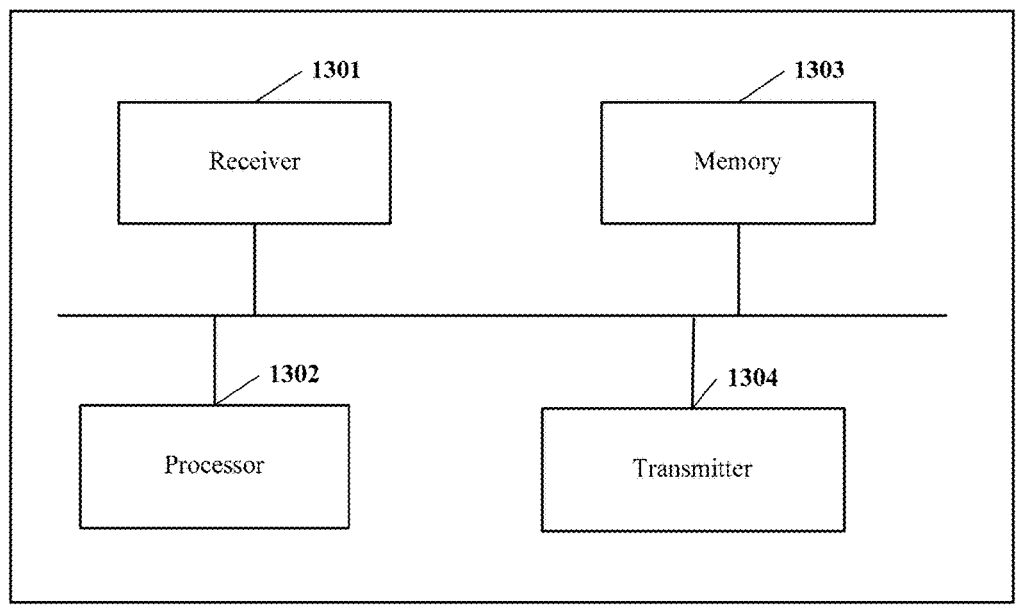
FIG. 13 is a schematic structural diagram of a computer system-based resource allocation apparatus according to the present disclosure.

As shown in FIG. 13, the present disclosure further provides a computer system-based resource allocation apparatus. In a specific implementation, the information notification apparatus may include: a receiver 1301, a processor 1302, a memory 1303, and a transmitter 1304.

The receiver 1301 is configured to receive a scheduling request sent by UE.

The memory 1303 is configured to store a computer executable instruction.

The transmitter 1304 is configured to: after the scheduling request is received, allocate a BSR transmission resource to the UE, and send, to the UE, notification information for allocating the BSR transmission resource.

The processor 1302 is configured to: receive a BSR transmitted by the UE on the BSR transmission resource, where the BSR carries driving status information of the UE; and allocate a radio resource applicable to a current driving status to the UE according to the driving status information.

In an embodiment, a manner in which the BSR carries the driving status information of the UE is as follows: The BSR carries an index value that corresponds to the current driving status of the UE, and the index value is determined by the UE according to an index relationship indicating a driving status of the UE.

In another embodiment, a manner in which the BSR carries the driving status information of the UE is as follows: loading the driving status information of the UE on multiple bytes in a driving status information indicator field in the BSR.

Specifically, the driving status information may include but is not limited to: at least one of current location information, moving speed information, or moving direction information of the UE.

In a specific implementation, the foregoing processor may be a central processing unit (central processing unit, CPU), an application-specific integrated circuit (application-specific integrated circuit, ASIC), or the like. A computer storage medium may store a program. When executed, the program may include some or all of the steps in the embodiments of the data transmission methods provided in the embodiments of the present disclosure. The storage medium may be a magnetic disk, an optical disc, a read-only memory (Read-Only Memory, ROM), a random access memory (Random Access Memory, RAM), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium and includes several instructions for instructing a computer device (which may be a personal computer, a server, or a network device) or a processor (processor) to perform all or a part of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An Internet-of-Vehicles communication method, comprising:
   sending, by a user equipment (UE), a scheduling request to a base station;
   receiving, by the UE, notification information sent by the base station for allocating a buffer status report (BSR) transmission resource;
   transmitting, by the UE, a BSR on the BSR transmission resource allocated by the base station, wherein the BSR carries driving status information of the UE for enabling the base station to allocate a radio resource applicable to a current driving status to the UE according to the driving status information; and
   transmitting, by the UE, data by using the radio resource allocated by the base station.

2. The method according to claim 1, further comprising:
   obtaining, by the UE, an index relationship indicating a driving status of the UE;
   determining, by the UE according to the index relationship, an index value that corresponds to the current driving status; and
   loading, by the UE, the index value in the BSR.

3. The method according to claim 1, further comprising:
   loading, by the UE, the driving status information of the UE in multiple bytes in a driving status information indicator field in the BSR.

4. The method according to claim 1, wherein the driving status information of the UE comprises:
   at least one of location information, moving speed information, or moving direction information of the UE.

5. An Internet-of-Vehicles communication method, comprising:
   receiving, by a base station, a scheduling request sent by a user equipment (UE);
   after receiving the scheduling request, allocating, by the base station, a buffer status report (BSR) transmission resource to the UE, and sending, to the UE, notification information for allocating the BSR transmission resource;
   receiving, by the base station, a BSR transmitted by the UE on the BSR transmission resource, wherein the BSR carries driving status information of the UE; and allocating, by the base station, a radio resource applicable to a current driving status to the UE according to the driving status information.

6. The method according to claim 5, wherein the BSR carries an index value that corresponds to the current driving status of the UE, and the index value is determined by the UE according to an obtained index relationship indicating a driving status of the UE.

7. The method according to claim 5, further comprising:
loading the driving status information of the UE in multiple bytes in a driving status information indicator field in the BSR.

8. The method according to claim 5, wherein the driving status information of the UE comprises:
at least one of location information, moving speed information, or moving direction information of the UE.

9. An Internet-of-Vehicles communications apparatus, comprising:
a transmitter, configured to send a scheduling request to a base station;
a processor, configured to:
after the transmitter sends the scheduling request to the base station, receive notification information sent by the base station for allocating a buffer status report (BSR) transmission resource;
after a receiver receives the notification information sent by the base station for allocating the buffer status report (BSR) transmission resource, transmit a BSR on the BSR transmission resource allocated by the base station, wherein the BSR carries driving status information of a user equipment (UE) for enabling the base station to allocate a radio resource applicable to a current driving status to the UE according to the driving status information; and
wherein the transmitter is further configured to transmit data by using the radio resource allocated by the base station.

10. The apparatus according to claim 9, wherein the processor comprises:
an index relationship obtaining unit, configured to obtain an index relationship indicating a driving status of the UE;
an index value determining unit, configured to determine, according to the index relationship, an index value that corresponds to the current driving status; and
an index value loading unit, configured to load the index value in the BSR.

11. The apparatus according to claim 9, wherein the processor loads the driving status information of the UE in multiple bytes in a driving status information indicator field in the BSR.

12. The apparatus according to claim 9, wherein the driving status information of the UE comprises:
at least one of location information, moving speed information, or moving direction information of the UE.

13. A resource allocation apparatus, comprising:
a receiver, configured to receive a scheduling request sent by a user equipment (UE);
a processor, configured to:

after the receiver receives the scheduling request, allocate a buffer status report (BSR) transmission resource to the UE, and send, to the UE, notification information for allocating the BSR transmission resource;
wherein the receiver is further configured to:
receive a BSR transmitted by the UE on the BSR transmission resource, wherein the BSR carries driving status information of the UE; and
wherein the processor is further configured to:
after the receiver receives the BSR transmitted by the UE on the BSR transmission resource, allocate a radio resource applicable to a current driving status to the UE according to the driving status information.

14. The apparatus according to claim 13, wherein the BSR carries an index value that corresponds to the current driving status of the UE, and the index value is determined by the UE according to an obtained index relationship indicating a driving status of the UE.

15. The apparatus according to claim 13, wherein the driving status information of the UE is loaded in multiple bytes in a driving status information indicator field in the BSR.

16. The apparatus according to claim 13, wherein the driving status information of the UE comprises:
at least one of location information, moving speed information, or moving direction information of the UE.

17. A non-transitory computer program product, comprising computer program code which, when executed by a computer unit, will cause the computer unit to:
send a scheduling request to a base station;
receive notification information sent by the base station for allocating a buffer status report (BSR) transmission resource;
transmit a BSR on the BSR transmission resource allocated by the base station, wherein the BSR carries driving status information of a user equipment (UE) for enabling the base station to allocate a radio resource applicable to a current driving status to the UE according to the driving status information; and
transmit data by using the radio resource allocated by the base station.

18. A non-transitory computer program product, comprising computer program code, which, when executed by a computer unit, will cause the computer unit to:
receive a scheduling request sent by a user equipment (UE);
after receiving the scheduling request, allocate a buffer status report (BSR) transmission resource to the UE, and send, to the UE, notification information for allocating the BSR transmission resource;
receive a BSR transmitted by the UE on the BSR transmission resource, wherein the BSR carries driving status information of the UE; and
allocate a radio resource applicable to a current driving status to the UE according to the driving status information.

* * * * *